W. H. MASON.
METHOD OF TRANSFERRING AND CLASSIFYING FREIGHT.
APPLICATION FILED MAR. 31, 1919.
1,437,535.  Patented Dec. 5, 1922.
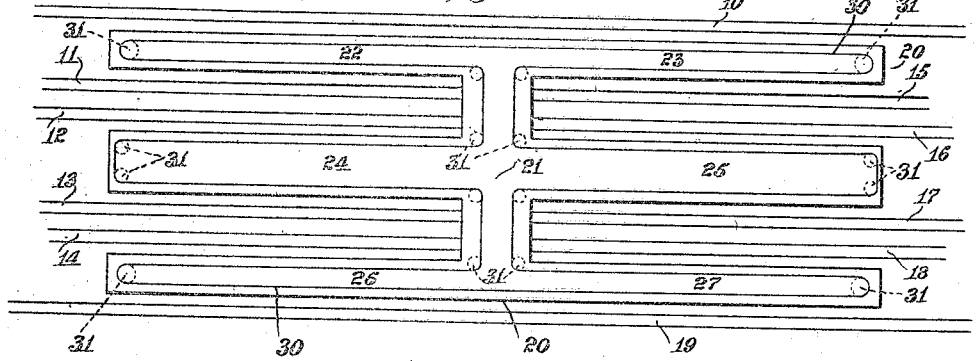
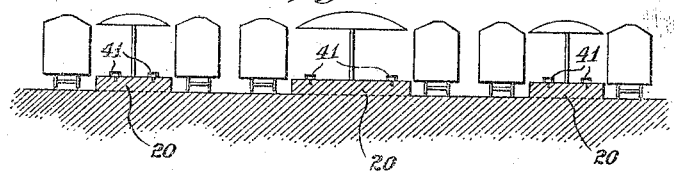
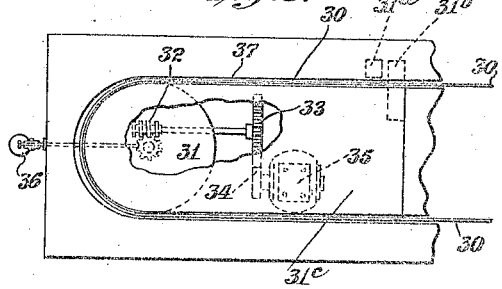
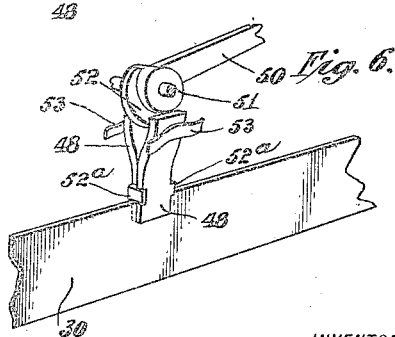
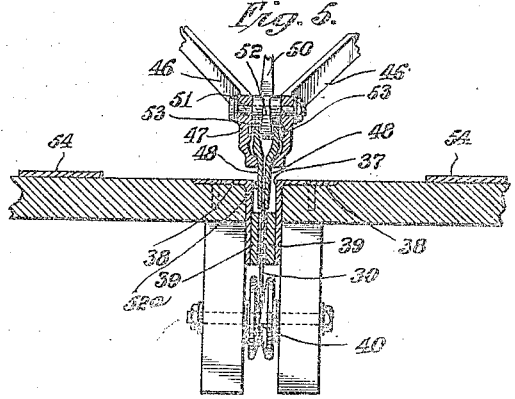
INVENTOR
William H. Mason
BY
N. H. Dyke
ATTORNEY Patented Dec. 5, 1922.

1,437,535

UNITED STATES PATENT OFFICE.

WILLIAM H. MASON, OF HAVERFORD, PENNSYLVANIA.

METHOD OF TRANSFERRING AND CLASSIFYING FREIGHT.

Application filed March 31, 1919. Serial No. 286,321.

*To all whom it may concern:*

Be it known that I, WILLIAM H. MASON, a citizen of the United States, and a resident of Haverford, county of Montgomery, and State of Pennsylvania, have invented certain new and useful Improvements in Methods of Transferring and Classifying Freight, of which the following is a specification.

My invention relates to an improved method of transferring freight at railway transfers and the like.

This application is a continuation in part of my former application, Serial No. 258,259, filed October 15, 1918.

At railway freight transfer stations, freight is taken from unloading platforms, way cars and the like, and transferred to other cars, principally to fully loaded or "car load" cars for shipment to distant parts, and to cars loaded "train order" in which the freight is put in last which is to be taken out at the first station, and so on, freight going to the terminal point to which the car is routed being loaded in first and taken out last.

Such transfer work is a very complicated job. In a moderately large transfer station, incoming freight loaded in say 200 freight cars, for example, must be transferred from any one of such incoming cars to one or more of about the same (or a somewhat smaller) number of outgoing cars, and the separate transfer operations may run into many thousands, some being for short distances where the car freight is taken from and the receiving car are located close together in the station, and some for much longer distances, in some cases as far as a quarter of a mile or even more.

This work so far as I am aware, is done either by ordinary hand trucking or according to one practice now in vogue, by trains of four wheeled trucks hauled about by tractors. Hand trucking is very hard labor and requires strong men to do it, and there is much waste of time and labor as in running back with empty trucks over long distances. The use of tractors and truck trains, while of undoubted advantage as compared with hand trucking, involves numerous objectionable features. It is frequently necessary to take out a truck from the middle of the train, necessitating stops, backing up to recouple, etc.; turning of the tractor and trucks on narrow platforms is difficult, and numerous other kindred difficulties are encountered.

The object of the present invention is to do away with difficulties of the character referred to, and to provide a method of freight classification and transfer whereby this important work may be performed very largely by power actuated mechanical means, with a minimum of labor, and whereby the work is lightened and may be done very largely by women and boys, making the services of large numbers of stronger men available for other work.

According to the present invention, an endless traveler is provided extending adjacent to all the cars in the station, and this traveler is moved continuously at a moderate rate of speed, say about 300 feet per minute.

A number of trucks—preferably four wheeled trucks—are provided, having means for removably attaching them to the traveler at any point in its length. When so attached or secured they travel in a closed path adjacent to all the freight cars in the station, and may be detached therefrom at any desired point, as for example, when a car is reached in which the articles loaded on the truck are to be placed, or where an empty truck is wanted, or the like. In a large installation the traveler may be of considerable length, say two miles or more, and several hundreds of such trucks may be required.

The trucks are preferably provided with placards or other marking to indicate the platform to which their contents are to go, the side of the platform on which the receiving car is located, and the car in which they are to be placed, and the like, and a common platform is preferably provided, which is traversed by the traveler, which preferably comprises a number of loops or branches approaching one another in the neighborhood of such common platform. The trucks may be short circuited from branch to branch of the traveler over such common platform, by a despatcher or attendant stationed there, and circuitous travel is thus avoided when desired.

In the accompanying drawing, I have illustrated a preferable form of apparatus for carrying out my improved method, but it is to be understood that other forms of apparatus may be used, as illustrated, for example, in my former application above noted.

In said drawing, Fig. 1 is a diagrammatic plan view of a freight transfer station, Fig. 2 is a cross-sectional view thereof, Fig. 3 is a plan view of one end of a platform portion, Fig. 4 is a side view of a truck and a portion of a band form of traveler, Fig. 5 is a cross-sectional view showing the slot in the platform, and means for connecting a truck to the traveler band, and Fig. 6 is a fragmentary detail perspective of one form of means for attaching trucks to the traveler band.

Railway tracks are shown at 11, 12, 13, 14, 15, 16, 17, 18 and 19, arranged in a transfer station having a platform generally designated by the numeral 20, and comprising a common cross connecting platform portion 21, and branches or extensions 22, 23, 24, 25, 26 and 27. The cross connecting part 21 is here shown as located about centrally, but its position may vary, so long as access can be had over the platform to the various parts and branches thereof. Instead of railroad tracks being located adjacent to the platform in all parts, some of the platforms or extensions thereof may be adapted wholly or in part, to be used by other transportation units, as wagons, trucks, barges, ships or the like. For simplicity, railway trucks are shown adjacent to all parts of the platform.

The traveler 30 preferably is in the form of a continuous ribbon or band of steel or similar material, which is well adapted for this use, as the entire platform is on one plane or level. Where band steel is used, it may be made in sections, and the sections secured together as by brazing, welding or the like, providing a smooth continuous band which may be of great length and is free from links, pins and the like, which are required in large numbers, where a chain traveler is made use of, for example. The traveler band 30 runs over a number of pulleys 31, and power may be applied at as many points in its length as desired. In Fig. 3, one of the pulleys 31 is shown driven through a worm 32 and gears 33, 34 from a motor 35, and the section 31$^c$ of the platform carrying the pulley 31, is movable, being held outwardly by a tensioning weight 36. By applying a number of drives and a number of weights 36, preferably at the outer ends of the platform parts, the expansion and contraction of the steel band 30, which may amount to several feet in a total length of two miles or so, is automatically taken care of. Stops at 31$^a$ and 31$^b$ serve to limit the outward movement of the pulley sections and to prevent the pinching or binding of the traveler band in its slot.

The platform 20 is provided with a narrow slot 37 in which the traveler 30 runs, and it may be armored as with angle irons 38, 38. Blocks 39, 39 may be provided at intervals to keep the traveler 30 central in slot 37. The band 30 is suitably supported at intervals as upon chilled rollers 40, and the slot 37 being open at its bottom, there is no opportunity for dirt, &c., to accumulate therein and clog the slot.

The trucks 41 used preferably have four wheels, the forward wheels 42 being swivelled on supports 43, so that the truck may turn readily and the rear wheels being designated by numeral 44.

Means are provided for removably clamping the trucks to the traveler band 30. Preferably the tongues or handles 45 are utilized for this purpose. One way of effecting this result, is by making the tongues or handles 45 in two parts, one of which may turn with respect to the other, and utilizing this turning action to operate a suitable clamping device. In the form shown, the rear handle section 46 which is attached to the truck, carries a grasping device at its forward end, comprising a hollow head 47 in which a pair of cooperating fingers 48 are mounted. These fingers extend through an opening in the lower side of the head 48, and being enlarged thereabove, obtain substantially a pivotal support therein. The outer tongue member 50 is pivoted at 51 to the rear tongue member 46, which is preferably of substantially yoke form (see Fig. 5), and is provided with clamp operating means as a cam 52 which enters between the upper ends of fingers 48 and turning them on their pivotal supports, produces a clamping action of their downwardly projecting ends, whereby the ribbon 30 may be clamped between them when the tongue member 50 is turned backward into the position shown in Fig. 4 for example. A stop member 52$^a$ may be provided in one or both of the clamping members 48 to support the tongue on the band 30, and to prevent the clamping members 48 extending too far in a downward direction, which would bring them into contact with blocks 39 or with pulleys 31, as will be plain from the showing in Figs. 5 and 6. Springs 53, 53 pressing inwardly against the upper ends of fingers 48 serve to spread fingers 48 apart at the lower ends when the tongue portion 50 is turned to ordinary extended position for drawing the truck along by its tongue, the fingers 48 fulcruming on one another at about the middle thereof. Other clamping means may, of course, be used.

The trucks may run on the wooden or concrete platforms which are at car floor level, but if desired, tracks such as iron plates 54, 54 may be provided to protect the platform from wear.

In making use of the apparatus described to carry out the method of the present invention, the traveler is continuously operated and the trucks are loaded with freight taken, for example, from a way freight car, and provided with a marker or placard or other designating device to indicate where its load belongs. A marker 55, removably held in a socket 56 provided to receive it, is shown in Fig. 4. The marker shown, bears the designation "Sec. 3, side W, car No. 15 Schenectady," indicating in this particular case that the contents of the truck are to go to the third platform section, the west side thereof and the car bearing No. 15, and is to be loaded therein in such order that it can readily be taken out when the car reaches the station of Schenectady, for example. To load the truck, it may be drawn into or alongside a freight car, and as it may be attached when loaded to the traveler at any point, the precise location of the car along the track is immaterial, and there is no necessity for "spotting" the cars, that is to say, arranging them in particular, definite locations as would be necessary, for example, if the trucks were run on tracks with switches or spurs running to the edges of the platforms making it necessary to locate the cars directly opposite such spurs or sidings. Such spotting of cars is a difficult and troublesome job for the switching crew, is productive of a great deal of bumping and uncoupling of cars and the like, takes a great deal of time and trouble, and is desirably to be avoided. By the use of the present invention, the train or series of cars may be simply run up on its track and left there, without uncoupling the cars or giving them any specific location, and this is a feature of great practical importance.

When desired as in order to obtain quick delivery to any particular point, or to relieve congestion, or the like, the trucks can be detached as at the common platform 21 and reattached to the traveler elsewhere, so as to short circuit unnecessary travel, and extra or empty trucks, etc. may be kept on this platform if desired. When the truck arrives at or near the car into which its contents are to go, it is detached and unloaded, and is then reattached to the traveler, and goes forward until it reaches a point at which an empty truck is needed, where it is detached and put to use in the same way.

The slow speed at which the traveler moves permits the moving of trucks freely across or along the platform in substantially any desired manner. This is of advantage when ordinary hand trucking is desired to be used to some extent as where explosives or other special articles of freight must be transferred with extra care by hand, or in other cases where hand trucking must be resorted to to some extent. This can be done over the platforms, which, when arranged for carrying out my improved method, is nevertheless left free for such work to be carried on. The system of transfer is highly flexible and readily adapted to a large variety of conditions and, as will be apparent, serves to reduce and lighten hand labor very materially, enabling a great volume of transfer work to be carried on expeditiously and economically and in an efficient and systematic manner. Each platform or section may have its own gang of workers whose operations may be confined substantially to that location, and there is substantially no occasion for running about from platform to platform as heretofore, and many other features of advantage are obtainable.

Maximum amount of traffic can be handled over a railroad line when all the trains over it run in the same direction. Similarly by my improved method a maximum amount of transfer work can be done in a limited space, as the traveler and trucks always move ahead in the same direction. In this way the transfer operations are carried on systematically and with great effectiveness as compared with the confusion and lack of a coordinated system necessarily characteristic of transfer by hand trucking, for example. The necessary equipment is not expensive to install, the operating expense is low and space is utilized to the greatest possible advantage. Saving space is often of great importance, as where the transfer station is located in a populous city, where space is highly valuable and room for extension may not be available. In such cases the ability to handle a greatly increased quantity of freight in the same or smaller space by my improved method may save the very large capital investment which would be required to move the transfer station to a new location.

I claim:

1. The method of transferring and classifying freight which consists in continuously moving a series of trucks in a closed path of travel in one plane and adjacent to a series of transportation units such as freight cars and the like, and having branches approaching one another about a common platform, removing individual trucks from the path of travel at any desired point therein, and placing freight thereon taken from a transportation unit, reintroducing said loaded trucks into the path of travel, and removing same therefrom at any desired point therein, transferring the freight loaded thereon to a transportation unit, reintroducing the tracks into the path of travel and transferring trucks from branch to branch of such path of travel over the common platform, whereby a portion of the path of travel is short circuited.

2. The process of transferring and classifying freight which consists in removably attaching trucks to a continuously moving traveler running in substantially a plane adjacent to a series of transportation units such as freight cars and the like, and comprising branches approaching one another about a common platform, detaching such trucks therefrom at any point in the path of travel, loading freight thereon and reattaching the loaded truck to the traveler at any desired point in its path of travel, detaching same from the traveler at any desired point in the path of travel and adjacent to the unit of transportation into which the freight is to be loaded, removing the freight therefrom and reattaching the unloaded truck to the traveler, and transferring trucks from branch to branch of the traveler over the common platform, whereby a portion of its path of travel is short circuited.

In testimony that I claim the foregoing, I have hereto set my hand, this 13th day of March, 1919.

WILLIAM H. MASON.